United States Patent [19]

Fujiwara

[11] 4,025,236
[45] May 24, 1977

[54] APPARATUS FOR RETURNING CONDENSATE

[76] Inventor: Katsuji Fujiwara, No. 191, Nishitani, Hiraoka-cho, Kakogawa, Hyogo, Japan

[22] Filed: Mar. 26, 1973

[21] Appl. No.: 345,246

[30] Foreign Application Priority Data

Mar. 24, 1972 Japan .................. 47-35407

[52] U.S. Cl. .................. 417/128; 417/131; 137/625.6
[51] Int. Cl.² .................. F04F 1/06
[58] Field of Search ..... 137/202, 206, 428, 596.14, 137/625.6; 417/126, 128, 130, 131, 134

[56] References Cited

UNITED STATES PATENTS

| 862,867 | 8/1907 | Eggleston | 417/390 |
|---|---|---|---|
| 1,258,835 | 3/1918 | Washington | 417/131 |
| 1,439,691 | 12/1922 | Chase | 417/128 |
| 2,192,200 | 3/1940 | Page | 417/128 |
| 2,644,405 | 7/1953 | Yeomans | 417/128 |
| 3,790,306 | 2/1974 | Uefuji | 417/128 |

FOREIGN PATENTS OR APPLICATIONS

| 6,967 | 7/1933 | Australia | 417/128 |
|---|---|---|---|
| 824,474 | 2/1938 | France | 417/131 |
| 931,694 | 7/1955 | Germany | 137/596.14 |
| 33,064 | 9/1971 | Japan | 137/209 |

Primary Examiner—Alan Cohan
Assistant Examiner—Gerald A. Michalsky
Attorney, Agent, or Firm—Toren, McGeady and Stanger

[57] ABSTRACT

To return condensate from a system using steam to a boiler, a sump chamber is arranged to collect the condensate and to return the condensate under pressure to the boiler when a float within the sump opens a pilot valve. High pressure gases from a compressor are supplied to a valve chamber which is in communication with the sump chamber through a valve. Normally, the pilot valve is closed and flow of the high pressure gases into the sump chamber is blocked. When the pilot valve is opened it, in turn, passes a flow of the high pressure gas so that it opens the valve in the valve chamber for admitting the high pressure gas into the sump chamber. When the valve is closed so that no high pressure gas enters the sump chamber, the sump chamber is connected to an exhaust port whereby it can be vented.

8 Claims, 3 Drawing Figures

APPARATUS FOR RETURNING CONDENSATE

BACKGROUND OF THE INVENTION

The present invention relates to apparatus for feeding a lower pressure liquid to a higher pressure system, in particular for returning condensate directly to a boiler in a steam-using system, as well as for pumping a liquid from a lower level to a higher one.

In steam-using systems, condensate is usually discharged from the system through a steam trap as soon as it is converted from steam after releasing its latent heat, however, the condensate still contains a considerable amount of heat. Conventionally, the condensate is not recycled except in occasional instances where it is utilized in a waste heat device. Accordingly, it is desirable to return the condensate directly to a boiler for recovering its entire heat content rather than discarding it, because the condensate is suitable for use in the boiler. Recently, the condensate has been returned to a boiler, usually by means of a pumping trap.

In conventional pumping traps, a float is operatively interconnected to two valves through a lever mechanism, one of the valves introduces a higher pressure medium into the trap for driving the condensate and the other valve affords an exhaust or vent from the trap. Accordingly, as the float rises and falls with the level of the condensate in the trap, it operates the valves so that while one is opened the other is closed. Further, a check valve is provided in each of an inlet passage into and an outlet passage from the trap so that the condensate can be admitted into the trap and then returned to the boiler.

In such an arrangement, it is difficult to ensure perfect coordination in the opening and closing of the valves and, since the valves are interconnected with the float through a lever mechanism, a slight shift of the float due to the upward and downward movement of the condensate level results in the commencement of one cycle operation of the trap, in such a cycle operation the amount of condensate returned is very small and cannot be predetermined and, further, a large amount of the condensate always remains in the trap. As a result this type of pumping trap cannot be used for returning large quantities of the condensate. Moreover, because of the lever mechanism, the structure of the trap is very complex and it is very difficult to maintain.

SUMMARY OF THE INVENTION

The present invention eliminates the difficulties experienced in conventional pumping traps and provides an apparatus for returning condensate to a boiler which is simple in construction and very reliable in operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
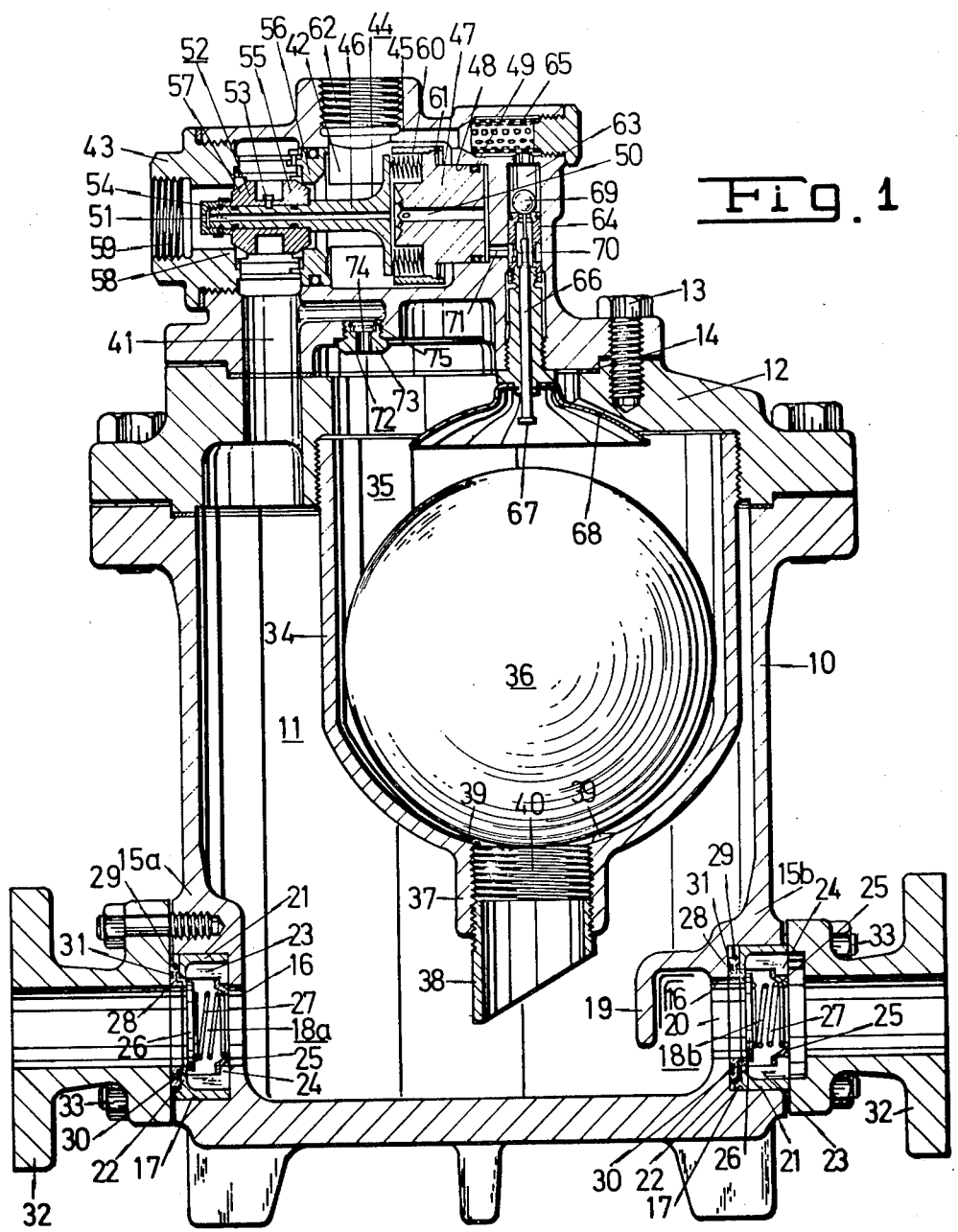
FIG. 1 is a vertical sectional view of one embodiment of the present invention.
Figure 2:
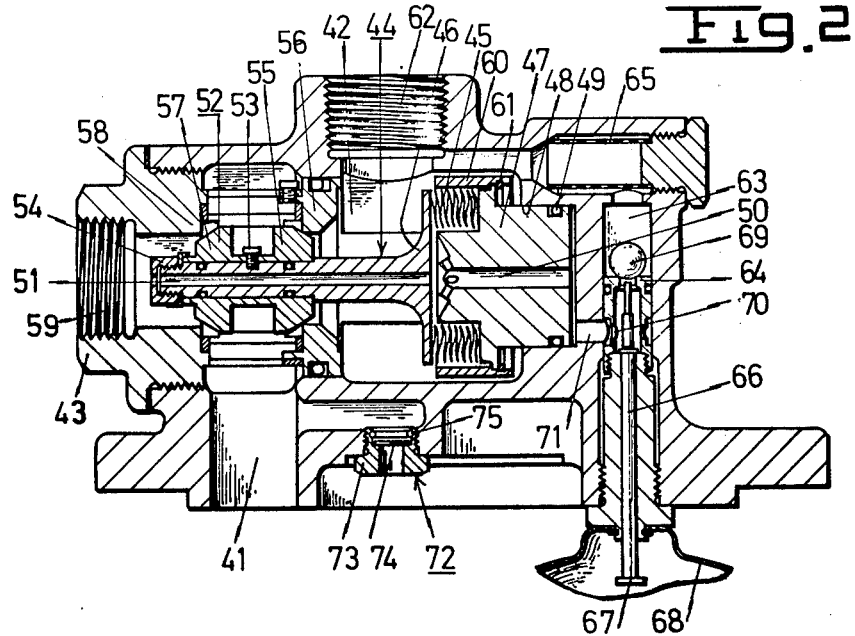
FIG. 2 is an enlarged sectional view of a portion of the apparatus shown in FIG. 1.

In FIGS. 1 and 2, an apparatus embodying the present invention is shown including a main body 10 consisting of a bottom and upwardly directed side walls forming a condensate sump chamber 11. The upper end of the sump chamber is closed by a cover member 12 mounted on the main body 10. Bolts 13 and packing 14 are used in forming a closed sealed structure.

Located on the opposite sides of the main body 10, at the lower ends of the side walls, are check valve retaining portions 15a, 15b to which condensate inlet and outlet conduits are connected. Each of the retaining portions 15a, 15b contains a bore 16 communicating directly with the sump chamber and another bore 17 spaced outwardly from the bore 16 and having a larger diameter than the inner bore. An inlet check valve unit 18a is provided in one of the larger diameter bores 17 while an outlet check valve unit 18b is located in the other bore 17. A hood-like wall member 19 is connected to the inner side wall of the main body and extends downwardly partially covering the bore 16 into the outlet port 20 leading to the outlet check valve unit 18b. This arrangement permits the condensate to be discharged until its level drops below the lower end of the hood-like member 19.

Each of the check valves 18a, 18b has a cylindrical casing 21 with one cylindrical end 22 located outwardly from the sump chamber in the inlet conduit and inwardly toward the sump chamber in the outlet conduit. Guide walls 23 are located within the casing 21 and have projections 24 located at the opposite end of the casing from the end 22. A spring bearing 25 is supported on the projections 24 and a disc valve 26 is located at the opposite end of the cylindrical casings from the projections 24 and a coil spring 27 extends between the spring bearing 25 and the disc valve 26 so that the disc valve engages an annular valve seat 28 secured to the inner wall of the casing 21 by a snap ring 29. The valve seat 28 is covered with a plastic substance 30, such as Teflon (Registered Trademark), for assuring an improved airtight seal. Packing 31 is provided at the ends 22 of the cylindrical casing 21. Each of the check valve units is secured within its bore 17 by a fitting or flange 32 secured to the main body 10 by bolts 33.

Within the condensate sump chamber 11, a bowl-shaped float housing 34 is threaded into and extends downwardly from the cover member 12 and forms a float chamber 35, rounded at its lower end. A float 36 is positioned within the float chamber 35 and is freely movable in the upward and downward directions of the chamber. The float 36 is in the foam of a spherical metal shell, however, other suitable buoyant materials and constructions can be used.

The lower end of the housing 34 is located above the locations of the inlet and outlet openings and it has a tubular shaped wall 37 threaded on its interior into which a pipe 38 is screwed to a predetermined position. The float chamber 35 communicates with the sump chamber 11 through the tubular member 37 and the pipe 38. Within the float chamber 35, immediately inwardly from the opening into the tubular member 37, a number of protrusions 39 are arranged to prevent the float 36 from blocking the port 40 defined by the tubular member 37. As a result, when the float 36 rests against the protrusions 39 it does not block the flow of condensate into the float chamber.

The cover member 12 forms a supply-exhaust passage 41 extending upwardly from the upper end of the sump chamber into a valve chamber 42 formed within the cover member. A plug 43 in threaded engagement with the top member forms a closure for one end of the valve chamber 42. A valve assembly 44 is positioned within the valve chamber 42 and includes a bellows 45 sealed at one end to a valve holder 46 and at its other end to a bellows bearing 47 located at the opposite end of the valve chamber from the plug 43. The outer surface of the bellows 47 is cylindrical in shape and is in intimate contact with a bore 48 in the cover member defining a portion of the valve chamber 42. O-ring 49 forms a sealing member between the outer cylindrical surface of the bellows bearing 47 and the bore 48. Further, an axially extending passage 50 is located within the bellows bearing between its opposite ends. A restricted passage 51 extends through the valve holder 46 from its end adjacent the bellows bearing to its end located within the plug 43. Mounted on the valve holder 46 and spaced axially from the bellows is a main valve 52 secured in position by a screw 53 and a cap nut 54. The main valve has two sealing portions or surfaces 55, 57, the surface 55 seats against a valve seat 56 when the bellows 45 is contracted and the other surface 57 seats against a valve seat 58 when the bellows is expanded. The valve seat 58 is located at one end of an exhaust port 59 formed by the plug 43. The valve seat 56 is formed at one end of a sleeve member 60 within which the bellows 45 is positioned. The sleeve member 60 is fixed to the bellows bearing 47 by a snap ring 61. A supply port 62 is formed through the cover 12 communicating with the valve chamber 42. Within the cover member 12, a passage 63 connects the supply port through the valve chamber 42 with the float chamber 35. A pilot valve seat member 64 is threaded into the passage 63 so that flow into the sump chamber 35 is blocked. At the upper end of the passage 63, a screen 65 is positioned through which flow from the supply port enters the passage. An operating rod 66 extends axially through the seat member 64 with its lower end 67 located within the upper portion of the float chamber 35 above the float 36 when it is in its rest position supported on the protrusions 39. When the float rises within the chamber 35 it contacts the rod 66 and displaces it upwardly through the seat member 64. Within the upper portion of the float chamber 35 a float cover 68 is positioned for guiding the float 36.

Within the flow passage 63 a spherically shaped pilot valve 69 is arranged to seat against the seat member 67 in contact with the upper end of the rod 66. The pilot valve is freely movable within the passage 63. Below the pilot valve, slots 70 in the seat member 64 and a hole 71 through the cover member connect the passage 63 with the end surface of the bellows bearing 47 so that when the pilot valve is opened flow through the passage 63 can pass into the passage 50 through the bellows bearing.

At the upper end of the float chamber 35, a vent valve 72 is arranged for venting air from the float chamber into the supply-exhaust passage 41. The vent valve consists of a main body 73 secured into the cover member and a disc valve 74 is positioned within the main body 73 and is prevented from slipping out by a snap-ring 75. When the air pressure within the float chamber 35 rises, the vent valve 72 opens permitting the air to pass into the supply-exhaust passage 41.

Based on the schematic arrangement shown in FIG. 3 the operation of the apparatus will be explained as it effects the return of condensate to a boiler.

Figure 3:
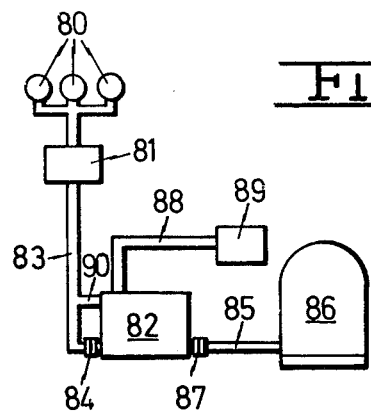
FIG. 3 is a diagram indicating the apparatus in which the present invention is utilized.

In FIG. 3 steam traps 80 discharge condensate from a steam-using apparatus to a collecting tank 81 and from the tank the condensate is conveyed to the apparatus 82 of the present invention through an inlet pipe 83 connected to a flange 84 which represents the flange 32 at the inlet to the sump chamber 11. On the opposite side of the apparatus 82 an outlet pipe 85 conveys the condensate to a boiler 86 and the flange 87 affords the connection to the flange 32 at the outlet from the sump chamber.

A supply pipe 88 conducts compressed air from a compressor 89 into the supply port 62 of the apparatus as shown in FIG. 1. Further, an exhaust pipe 90 is shown leading from the apparatus 82 and is connected to the exhaust port 59, as shown in FIG. 1, for equalizing the pressures within the sump chamber 11 and the interior of the inlet pipe 83. Initially, as shown in FIG. 1, the various parts of the apparatus embodying the present invention are illustrated in the static or rest position which corresponds to the condition when there is little or no condensate within the sump chamber 11. In this condition, the float 36 is in its lowermost position as shown in FIG. 1, however, it does not seal the port 40 because it rests on the protrustions 39 which space it from a closing position with the port. Further, the float is spaced below the enlarged lower end 67 of the operating rod 66. The high pressure gas from the compressor is introduced through the supply port 62 into the valve chamber 42 and contacts the exterior of the bellows 45. Further, the high pressure gas enters the passage 63 through the screen 65 and causes the pilot valve 69 to seat tightly against the valve seat member 64 so that a seal is provided blocking the passage of the high pressure gas into the interior of the bellows 45 through the passage 50 in the bellows bearing 47. At the same time, the pressure within the interior of the bellows 45 is in communication with the exhaust port 59 through the passage 51 and, since the passage is restricted it results in a reduction in the pressure within the interior of the bellows 45. Accordingly, the bellows is contracted and the valve holder 46 connected to the bellows moves the main valve 52 in the rightward direction, as viewed in FIG. 1, causing the surface 55 to seat tightly against the seat 56 and blocking any flow of the high pressure gas into the sump chamber. However, the surface 57 is spaced from the seat 58 so that the exhaust port 59 is connected to the supply-exhaust passage 41.

With the sump chamber 11 in communication with the exhaust port 59 and the exhaust pipe 90, the air in the sump chamber is vented into the inlet pipe 83 through the exhaust port and the condensate flows into the sump chamber through the inlet check valve 18a which is opened due to the pressure developed by the head of condensate within the inlet pipe 83. At this time, the outlet check valve 18b is closed by the pressure within the boiler 86 communicated through the outlet pipe 85. As the condensate continues to flow into the chamber 11 its level gradually rises and enters the float chamber 35 through the connecting pipe 38 and tubular member 37 and eventually reaches a level which causes the float to move upwardly and the air within the float chamber 35 is vented through the valve 72. As the float rises it eventually reaches the enlarged end 67 of the rod 66 and with increased buoyancy moves the rod 67 upwardly for upward displacement of the pilot valve 69 within the passage 63.

However, the pilot valve 69 is not displaced from engagement with the seat member 64 until the buoyancy of the float affords an upwardly directed force sufficient to overcome the downward pressure of the compressed gas or air on the valve 69.

The float cover 68 provides a guide for the upper surface of the float so that it maintains an upward force against the lower end of the rod independent of the location of the condensate surface.

When the pilot valve is opened, the compressed gas flows through the slots 70 and holes 71 to the end of the bellows bearing 47 and then through the passage 50 into the interior of the bellows causing the pressure therein to increase. Since the passage 51 is appropriately restricted, the bellows expands and causes the valve holder 46 and the valve 52 to move in the leftward directon, as viewed in FIG. 1, so that the surface 55 on the valve is spaced from its seat 56 while the surface 57 is in contacting engagement with the seat 58 closing off flow from the sump to the exhaust port 59. In this condition, the compressed gas entering through the supply port 62 flows through the valve chamber 44 between the surface 55 and the seat 56 and through the supply-exhaust passage 41 into the upper end of the sump chamber 11. The compressed gas exerts a downward force on the condensate within the sump chamber so that the inlet check valve 18a is closed and the outlet check vlave 18b is opened. Thus, the downward force drives the condensate out through the port 20 into the outlet pipe 85 for its return to the boiler 86, because the pressure provided by the compressor is larger than that of the boiler.

As the condensate is discharged from the sump chamber 11, its level falls, however, the level of the condensate within the float chamber remains until the condensate level in the sump chamber 11 drops below the predetermined level of the lower end of the pipe 38. During this time, the vent valve 72 is closed by the pressure difference between the float chamber 35 and the combination of the weight of the disc 74 and the compressed gas within the supply-exhaust passage 41.

As a result, the float remains in its upward position and through the operating rod 66 keeps the pilot valve open until the condensate falls below the predetermined level. When the float falls the pilot valve reseats against the seat member 64 and closes off the flow of the compressed gas.

With the pilot valve closed, the various parts of the apparatus return to the starting position, as indicated in FIG. 1, and another cycle of the apparatus can be performed.

By virtue of the arrangement of the apparatus, the pilot valve 69 is opened when the float reaches a predetermined level so that the condensate can be discharged. The pilot valve remains in the open position until the condensate falls below a predetermined level defined by the lower end of the pipe 38, because the vent valve is closed and the float cover keeps the float in the upward position in engagement with the lower end of the rod 66, independent of the outflow of the condensate.

When the pilot valve is open the higher pressure gas admitted to the interior of the bellows causes the main valve in the valve chamber in the cover member to open affording the flow of the pressurized gas into the sump chamber. However, the movement of the main valve is not effected through the combination of a float and a lever mechanism. Therefore, the present inventon affords accurate and reliable operation of the condensate return to the boiler, and the apparatus embodying the invention has a simple structure and is of relatively small size in comparison with its discharge capacity and, further, it is easy to maintain.

In addition, this apparatus can be used not only for returning the condensate to a boiler, but also for discharging the condensate from one system operating under a lower pressure to another system operating under a higher pressure, for example, as a vacuum trap discharging the condensate under a vacuum into the atmosphere. Further, as can be appreciated, the invention has many other uses.

While a specific embodiment of the invention has been shown and described in detail to illustrate the application of the inventive principles, it will be understood that the invention may be embodied otherwise without departing from such principles.

What is claimed is:

1. An apparatus for accumulating condensate and for directing the condensate to a source, such as a boiler, comprising wall means forming a closed condensate sump chamber, said wall means including a condensate inlet to said sump chamber and a condensate outlet from said sump chamber, a float housing forming a float chamber positioned within and spaced above the base of said sump chamber, a float positioned within and freely vertically displaceable within said float chamber, a tubular member secured to said float housing and extending downwardly therefrom within said sump chamber and providing a first passageway communicating between said float chamber and said sump chamber, a check valve positioned within each of said inlet to and said outlet from said sump chamber, said wall means including a cover closing the upper end of said sump chamber, wherein the improvement comprises that said cover forms a single valve chamber having a high pressure operating gas supply port and a high pressure operating gas exhaust port located at spaced apart positions and each communicating with said single valve chamber, and a high pressure operating gas supply-exhaust passage formed by said cover member communicating between said sump chamber and said single valve chamber, said cover including a second passageway bypassing said valve chamber and communicating between said supply port and said float chamber, a single valve unit located within said single valve chamber and including a displaceable valve support member extending through said single valve chamber and positioned in the path therethrough between said supply port and exhaust port, a valve member mounted on said valve support member and displaceable therewith and having two spaced sealing surfaces arranged to contact two separate surfaces of said valve chamber for controlling flow therethrough from said supply port and said exhaust port to said supply-exhaust passage, a bellows bearing member located within said valve chamber and spaced from said exhaust port, a bellows sealingly connected to said bellows bearing member and to said valve support member and forming a bellows chamber located within said bellows and between said valve support member and bellows bearing member, said valve support member forming a third passageway having a restricted flow path communicating between said bellows chamber and said exhaust port, said cover forming a fourth passageway communicating between said second passageway and said valve chamber, means blocking the path of flow through said second passageway to said float chamber, a pilot valve associated with said blocking means within said second passageway for opening and closing the flow therethrough between said supply port and said fourth passageway, said blocking means in said second passageway including an upwardly extending displaceable rod which has its lower end located within said float chamber and its upper end located within said second passageway so that said rod is displaceable by said float as it rises upwardly within said float chamber and in turn displaces said pilot valve within said second passageway for admitting flow from said supply port through said second passageway and fourth passageway into said single valve chamber, said bellows bearing member forming a flow passage between said valve chamber and said bellows chamber, so that in response to the movement of said float as said rod moves said pilot valve between its open and closed positions for introducing high pressure gas from said supply port through said second passageway, fourth passageway, valve chamber and bellows bearing member into said bellows chamber when said pilot valve is opened for displacing said valve support member and said valve member mounted thereon for admitting the high pressure operating gas through said supply-exhaust passage into said sump chamber whereby the condensate therein is discharged through said outlet from said sump chamber and when said pilot valve is closed said valve support member and valve member are positioned so that said sump chamber is in communication through said supply-exhaust passage with said exhaust port.

2. An apparatus, as set forth in claim 1, wherein said wall means forming said sump chamber comprises a bottom wall, side walls extending upwardly from said bottom wall and said cover removably attached to and enclosing the upper end of said side walls.

3. An apparatus, as set forth in claim 2, wherein said inlet to and outlet from said sump chamber are located in the lower ends of said side walls on the opposite sides of said sump chamber below the lower end of said float chamber.

4. An apparatus, as set forth in claim 2, wherein said float housing is attached to said cover and extends downwardly therefrom to a plane extending transversely of said side walls and located above said inlet and outlet from said sump chamber.

5. An apparatus, as set forth in claim 4, wherein said tubular member is secured to and extends downwardly from the lower end of said float housing.

6. An apparatus, as set forth in claim 2, wherein a hood-like member is secured to said side walls and extends inwardly into sump chamber and downwardly over said outlet therefrom.

7. An apparatus, as set forth in claim 1, wherein said means within said second passageway forming a valve seat, said pilot valve being spherical in shape and arranged to seat on said valve seat in its closed position.

8. An apparatus, as set forth in claim 1, wherein a float cover is attached to said cover in the upper end of said float chamber for receiving said float in its upwardly disposed position.

* * * * *